United States Patent [19]
Levine

[11] Patent Number: 5,890,079
[45] Date of Patent: Mar. 30, 1999

[54] REMOTE AIRCRAFT FLIGHT RECORDER AND ADVISORY SYSTEM

[76] Inventor: Seymour Levine, 21645 Saddle Peak Rd., Topanga, Calif. 90290

[21] Appl. No.: 768,313

[22] Filed: Dec. 17, 1996

[51] Int. Cl.$^6$ .................................................. G06F 165/00
[52] U.S. Cl. ................................ 701/14; 701/29; 701/35; 701/301; 701/120; 340/961; 342/36
[58] Field of Search .................................. 701/14, 29, 35, 701/301, 120; 340/945, 961, 963, 971; 342/29, 36–38, 454, 455, 456

[56] References Cited

U.S. PATENT DOCUMENTS

| | | | |
|---|---|---|---|
| 4,729,102 | 3/1988 | Miller, Jr. et al. | 364/424 |
| 5,153,836 | 10/1992 | Fraughton et al. | 701/301 |
| 5,325,302 | 6/1994 | Izidon et al. | 364/461 |
| 5,383,133 | 1/1995 | Staple | 364/508 |
| 5,463,656 | 10/1995 | Polivka et al. | 375/200 |
| 5,467,274 | 11/1995 | Vax | 364/424.06 |
| 5,493,309 | 2/1996 | Bjornholt | 701/301 |
| 5,657,009 | 8/1997 | Gordon | 701/14 |
| 5,677,841 | 10/1997 | Shiomi et al. | 701/301 |
| 5,714,948 | 2/1998 | Farmakis et al. | 340/961 |
| 5,740,047 | 4/1998 | Pilley et al. | 701/301 |

Primary Examiner—Gary Chin
Attorney, Agent, or Firm—Norton R. Townsley

[57] ABSTRACT

This invention is a system that monitors many performance parameters and many aircraft operational parameters, and broadcasts this information along with aircraft identification, audio, video, global positioning and altitude data, to a world wide two-way rf network. This information is monitored and recorded at a remote, centralized location. At this location, this information is combined with archived data, ATC data, weather data, topological data, map data, and manufacturers' data. Analysis of this combined data allows identification of problems and generation of advisories. Six types of advisories are generated: maintenance, safety of flight, flight efficiency, flight separation, safe to fly and safe to take off. In the event of a crash the remotely recorded data provides an instant indication of the cause of the crash as well as where the crashed plane can be found. Use of this invention allows replacement of the current, on-board flight data recorders thus saving costs and weight. Having the recorded data at a remote site eliminates the need to search for flight data recorders. Other advantages are back-up for ATC radar position data, better control of aircraft separation, improved flight efficiency, and allowing use of simpler and lower power radar.

27 Claims, 4 Drawing Sheets

REMOTE AIRCRAFT FLIGHT RECORDER AND ADVISORY SYSTEM

BACKGROUND OF THE INVENTION

This invention relates to the field of flight recorders and more particularly to automatic, real-time, collection of aircraft data and then transmission of such data to a world wide communication system for subsequent reception, analysis, storage and generation of aircraft flight, safety, fuel efficiency and maintenance advisories at a Central Ground Based Processing Station (CGBS).

Whenever an airplane crashes, authorities are anxious to find the flight data recorder. This is because it may reveal the causes of the crash. It is important to determine the cause because it may result from a problem affecting many flying aircraft. The flight data or crash recorder, sometimes also called a black box, is usually a tape recorder which is capable of recording many channels of information. However, recorders utilizing other storage media, such as compact discs are starting to be used because of their increased storage capacity. Regardless of storage medium used, the information recorded includes various flight parameters, such as engine status, fuel status, airspeed, position, altitude, attitude, control settings, and cockpit acoustic information. The information comes from sensors in the cockpit and at other strategic locations around the airplane. However, the information stored by the data recorder is often discarded shortly after each flight. If all flight data were analyzed in conjunction with weather, air traffic control (ATC) data and map data, they could become a valuable resource for detecting potential problems and improving aircraft design.

Sometimes it is difficult to locate the crashed plane, and, even when the crash site is known, it is sometimes difficult to locate the flight data recorder. The latter is frequently a problem when the airplane crashes in water.

To fulfil their intended purpose, current flight data recorders must be made crash resistant. Consequently, they are constructed of rugged materials which means that they are costly to produce and heavy. Use of a lighter flight data recorder would result in an aircraft cost and weight savings.

Moreover, except for occasional post flight analysis, current, recorded flight data exists in a vacuum. If they were analyzed in conjunction with weather data, manufacturer's data, map data, ATC data and position and altitude data, it would become a much more powerful tool.

In recent years there have been a number of developments in flight data recorders. U.S. Pat. No. 4,729,102 discloses a flight data recorder system which monitors a number of aircraft parameters and compares them to stored information to provide for more efficient aircraft operation and detection of excessive wear. This information is displayed and stored on-board and may be downloaded periodically via a link to a ground readout unit.

U.S. Pat. No. 5,463,656 discloses a system for broadcasting full broadcast quality video to airplanes in flight via satellite relays. The system includes video bandwidth compression, spread spectrum waveform processing and an electronically steered, circular aperture, phased array antenna, that conforms to the surface of the aircraft.

U.S. Pat. No. 5,467,274 discloses a method of recording selected flight data, including GPS data, onto a VTR and thereafter subjecting the recorded data to a data reduction process on the ground.

U.S. Pat. No. 5,325,302 discloses an aircraft collision warning system which includes a position determining subsystem, a trajectory determining subsystem, a collision predicting subsystem and a warning device.

U.S. Pat. No. 5,383,133 discloses a computerized, integrated, health monitoring and vibration reduction system for a helicopter.

However, none of these developments contemplates long term central storage of all recorded information for archival uses. Also none contemplates real-time radio transmission of aircraft data to a central station. Furthermore, none contemplates combining information from aircraft with global position data, global map data, global weather data, ATC system data and manufacturers' data and providing real-time feedback, in the form of real-time ground and in-flight advisories to aircraft.

What is needed is a flight recorder system that senses many flight parameters and many aircraft operational parameters, and transmits this information along with aircraft identification and cockpit audio and video to a world wide, two-way radio frequency (rf) network. This information could then be monitored and safely recorded at a remote location where it could be analyzed in conjunction with archived data, flight control data, weather data, topological data, global positioning data and manufacturers' data to allow identification of maintenance problems, on-ground safety advisories and in-flight safety advisories. There are three types of in-flight advisories: emergency or safety of flight, flight efficiency or fuel economy, and flight separation. On the ground there are also three types of advisories: safe to fly, safe to take off and maintenance actions.

In the event of a crash having the recorded data at a remote site would eliminate the need to search for flight data recorders and allow instant analysis of the failure mode. Further, the remotely recorded data would provide the best estimate of where the crashed plane could be found. This estimate would be based on the aircraft's last telemetry of its position, engine and control status, its flight dynamics and ATC radar data (when available). Use of this invention would allow replacement of the current, on-board flight data recorders thus saving costs and weight. Other advantages would be back-up for radar position data, better control of aircraft separation, and improved flight efficiency. Development of a such a system represents a great improvement in the fields of flight data recorder design, aircraft safety and airline efficiency, and satisfies a long felt need of airplane manufacturers, airlines, maintenance personnel and crash investigators.

SUMMARY OF THE INVENTION

The present invention is a remotely located, aircraft, flight data recorder and advisory system. These functions are achieved by continuously monitoring aircraft sensors such as aircraft position, altitude, speed, control surface settings, engine revolutions per minute, temperatures, stress, and fuel. Then by rf world wide transmission, such as via satellite communication links, these parameters are communicated, along with cockpit audio data, video data, aircraft identification and configuration, to a central ground based monitoring station where they are continually and safely recorded and analyzed. The transmission of the aircraft data via the communication link permits the aircraft performance and cockpit communication data to be memorized in a ground based recorder for after crash analysis without the necessity of rugged and waterproof monitoring apparatus aboard the aircraft. Also, in the event of a pilot initiated or ground station initiated alert, based on the real-time automated analysis of the aircraft's flight worthiness, a pilot crash avoidance safety advisory can be radioed back to the aircraft that provides the pilot with expert advice as to the safest approach for the operation of the aircraft.

The central ground based monitoring system utilizes the real-time aircraft sensor data, aircraft configuration data and experts familiar with the aircraft in arriving at the best safety advisory. The computational analysis processors used to perform the safety analysis on the ground are not limited by the space and power restrictions that exist aboard the aircraft and thus can provide high fidelity simulation and analysis of the aircraft's problem. In this mode of operation, the central, ground based monitoring site maintains communication, utilizing fiber optic ground or satellite links, with flight controller facilities and with the aircraft manufacturers. It distributes the aircraft sensor data to them in real-time so as to solicit their expert analysis and help in generating the crash avoidance advisories. Real-time analysis of the preflight aircraft data along with other data such as weather, airport and its local area map, three dimensional topographical map information, from data bases such as Digital Terrain Elevation Data (DTED), ATC data, wind shear, and aircraft configuration are also used to provide a safe to take off advisory.

In addition to the above, if an aircraft exhibits a mechanical equipment failure prior to take off, the aircraft's sensor monitoring data are also communicated back to the aircraft manufacturer in real-time. The aircraft manufacturer then provides the mechanics with a preferred maintenance advisory based on an expert system for fault isolation that will save both time and money in getting a safe to fly aircraft back in service.

For aircraft that are equipped to receive the satellite constellation Global Positioning System (GPS) or the Global Navigation Satellite System (GLONASS) precision navigation signals, these real-time sensor data of aircraft location are transmitted to the CGBS. This very accurate aircraft position data is utilized to augment the ATC in-flight and airport taxi collision avoidance systems as well as to enhance the all weather landing systems. It provides the air traffic controllers' ground based radar systems with a level of redundancy and enhances the radar systems by providing high fidelity, three dimensional, world wide aircraft separation distances. This eliminates five deficiencies in the current radar ATC systems:

a. invisibility of small aircraft due to minimal radar cross-section;
b. distinguishing multiple aircraft flying close to each other because of beam width ambiguity;
c. beam shadowing problems;
d. range problems; and
e. earth curvature problems.

An added economic benefit of utilizing this position data blended with other aircraft sensor information and world wide weather and destination airport traffic data available at the CGBS is to provide the aircraft with a real-time fuel conservation and economy of flight information. The world wide communication up link advisory to the aircraft during flight for fuel conservation and economy of flight operation is based on the blending of the data sources in a ground based digital processor. Thus, for this additional function, there is no need for added equipment to be carried aboard the aircraft. It also allows for simpler, lower cost and lower power ATC radar.

In the event of a crash, the aircraft sensor data stored at the CGBS, which has a record of the operating condition of the aircraft at the time of the crash, provides the best estimate of the downed aircraft's location for timely recovery and potential rescue operations as well as the parameters that may have caused the crash. Furthermore, for operational aircraft experiencing an equipment failure or in a potentially over-congested area of operation, the real-time expert advisories communicated to the aircraft may well prevent the loss of life by giving the pilot the best crash avoidance information. In addition post-flight analysis of aircraft data may provide clues to the cause of a problem so as to prevent its recurrence in the future. Even for operational aircraft experiencing no current faults, the CGBS keeps a record of flight hours accumulated on the airframe and critical parts to assure that routine maintenance is timely performed and that the vehicle does not accumulate excessive stress build-up on flight critical assemblies. The CGBS sends out alerts for maintenance actions.

The system integrates voice, video and instrument data into a single aircraft telemetry system that provides two way, world wide communication with the aircraft, and ground based archival recording of the data. For maintenance actions, it also communicates, via a local computer terminal or visor display to the aircraft ground maintenance personnel, the problem specific, vehicle aircraft manual data that shows how best to service the vehicle. This eliminates much of the paper manuals and assures that the latest aircraft maintenance information is being utilized for repair. It also provides an expert fault isolation system that saves both time and money in getting a safe to fly aircraft back in service.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
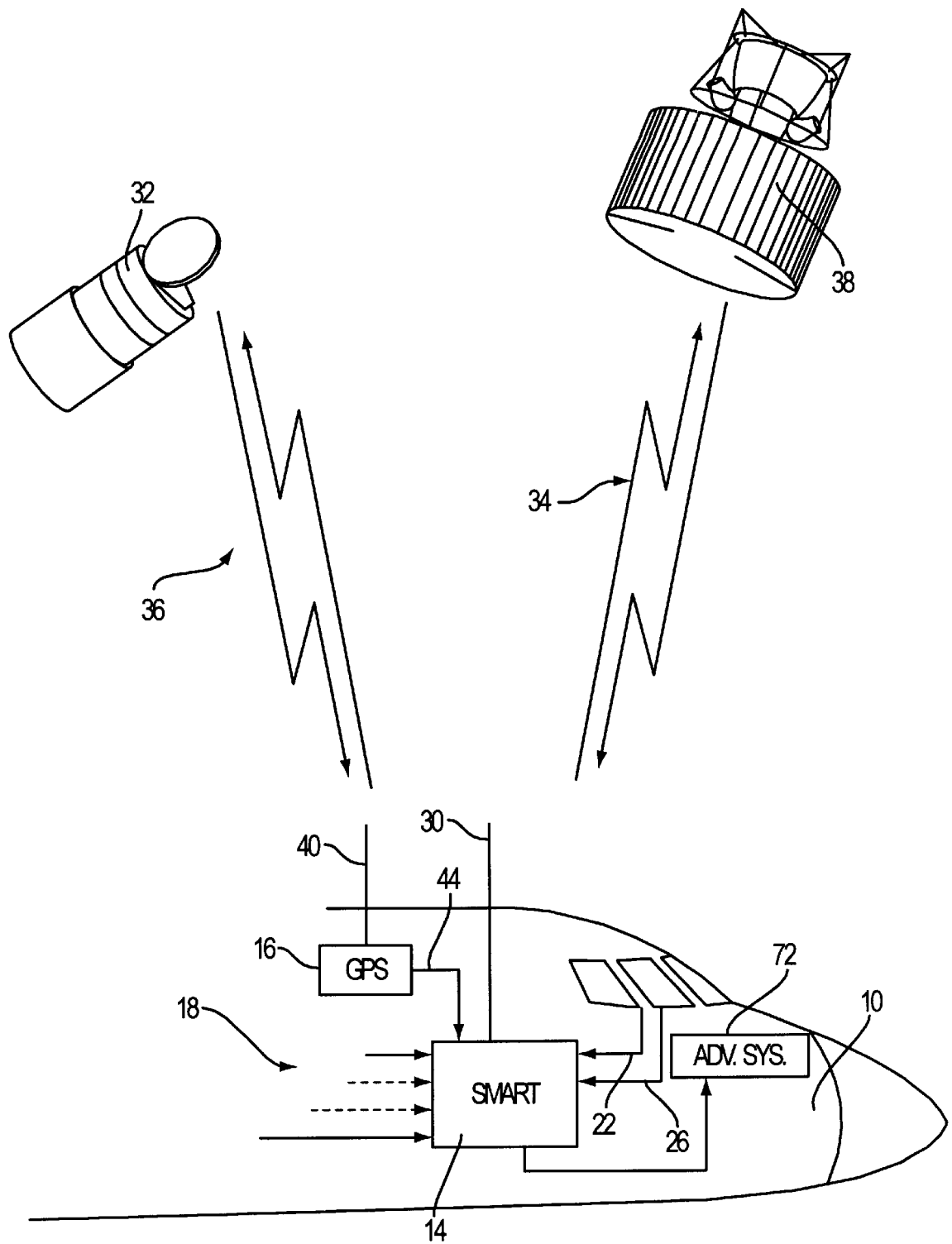
FIG. 1 is a block schematic of an aircraft's multiplexed flight sensors, sensor transmitter and advisory receiver according to the invention.

FIG. 1 shows an aircraft 10 equipped with a Sensor Multiplexer Receiver & Transmitter (SMART) 14 which is a line replaceable unit. The aircraft is also equipped with a GPS receiver system 16. The GPS system 16 receives ultra high frequency (uhf) radio signals 36 from several GPS satellites 32 via its GPS antenna 40, calculates the position and altitude of the aircraft 10 and reports this position and altitude data 44 to the SMART 14. The SMART 14 also receives aircraft performance and control data 18, acoustic data 22, and video data 26. The video data 26 comes from cameras which monitor the cockpit, the passenger compartment, and the cargo compartment. SMART 14 periodically samples the sensor signals 18, 22, 26, 44 converts all non-digital sensor signals 18, 22, 26, 44 into digital format, adds a sensor identification label to each signal 18, 22, 26, 44 plus an aircraft identification and configuration label. Then the SMART 14 ultra high frequency radio electronically modulates the combined data and sends them to the aircraft satellite telemetry antenna 30. It should be noted that, to save weight, one antenna could serve the functions of the GPS antenna 40 and the aircraft satellite telemetry antenna 30. Then this uhf signal is transmitted by the aircraft antenna 30 to an earth orbiting communication satellite 38 that is located in a direct, unobstructed, line of sight with the aircraft 10. In addition to transmitting data, the SMART 14 receives data from the satellite 38. As will be described more fully below, this data is mostly in the form of advisories and alerts. Such advisories and alerts are reported to the crew via an on-board advisory system 72.

Figure 2:
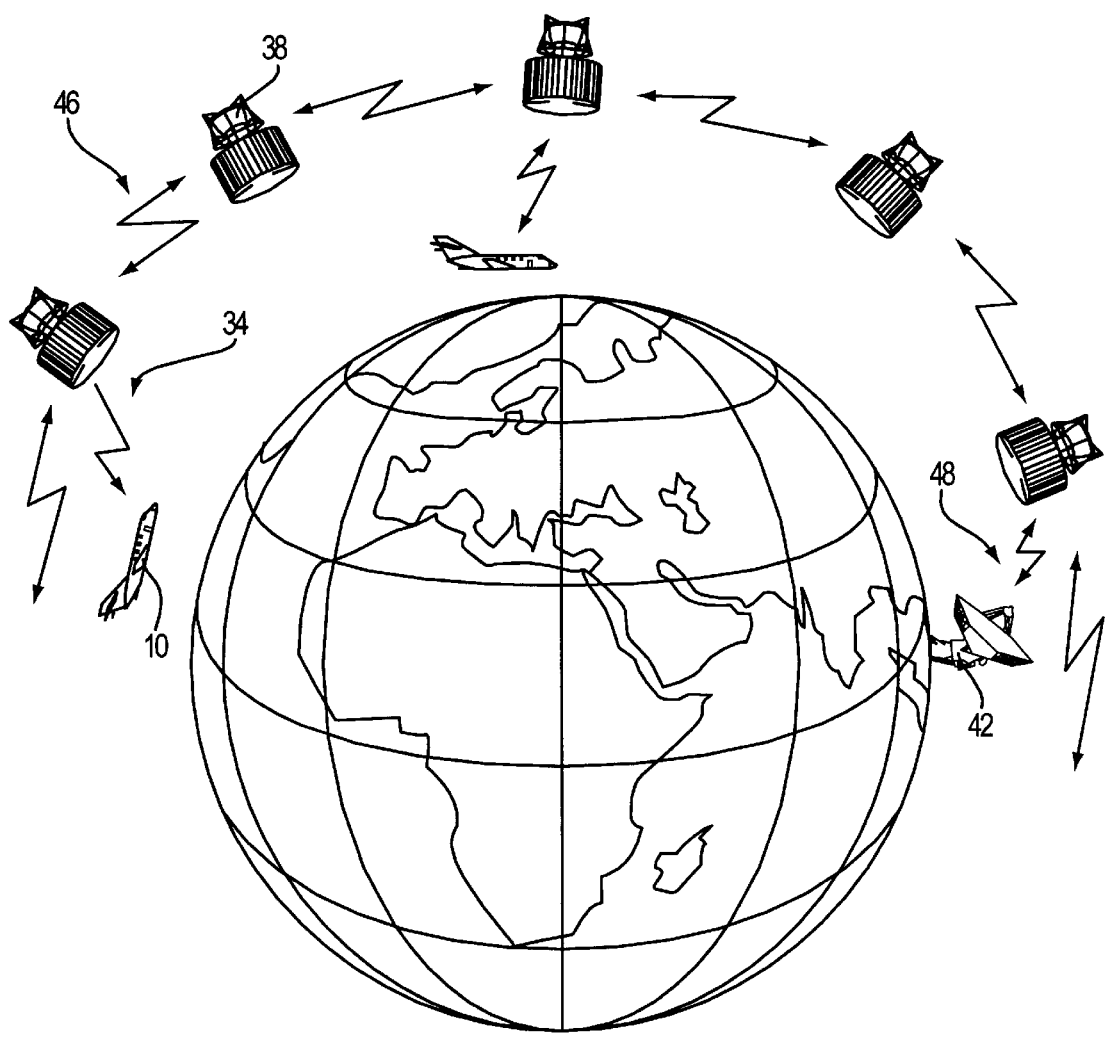
FIG. 2 illustrates worldwide communication via a satellite system and CGBS.

FIG. 2 illustrates the communication satellite link 34, 46, 48 between the aircraft 10 and the CGBS 42. It shows SMART 14 equipped aircraft 10 transmitting their sensor data over an uhf radio, unobstructed line of sight, transmission 34 to the closest communication satellite 38. The satellite, world wide communication link then relays the data by line of sight transmission 46 to other communication satellites 38 followed by line of sight transmission 48 to the CGBS 42. The transmission of aircraft advisories from the CGBS 42 to the aircraft 10 is accomplished by communicating along the same path but in the reverse direction. FIG. 2 depicts a continuous, around the clock, world wide communication link 34, 46, 48 that provides two way communication with all of the aircraft 10 equipped with SMART 14 in the Remote Aircraft Flight Recorder And Advisory (RAFT) System 50. The number of satellites 38 in the communication system depends on whether a geosynchronous or low earth orbit (LEO) satellite constellation is utilized. The system will work with either of the satellite constellations. The LEO constellation requires smaller, lighter and lower power equipment but a larger number of satellites.

Figure 3:
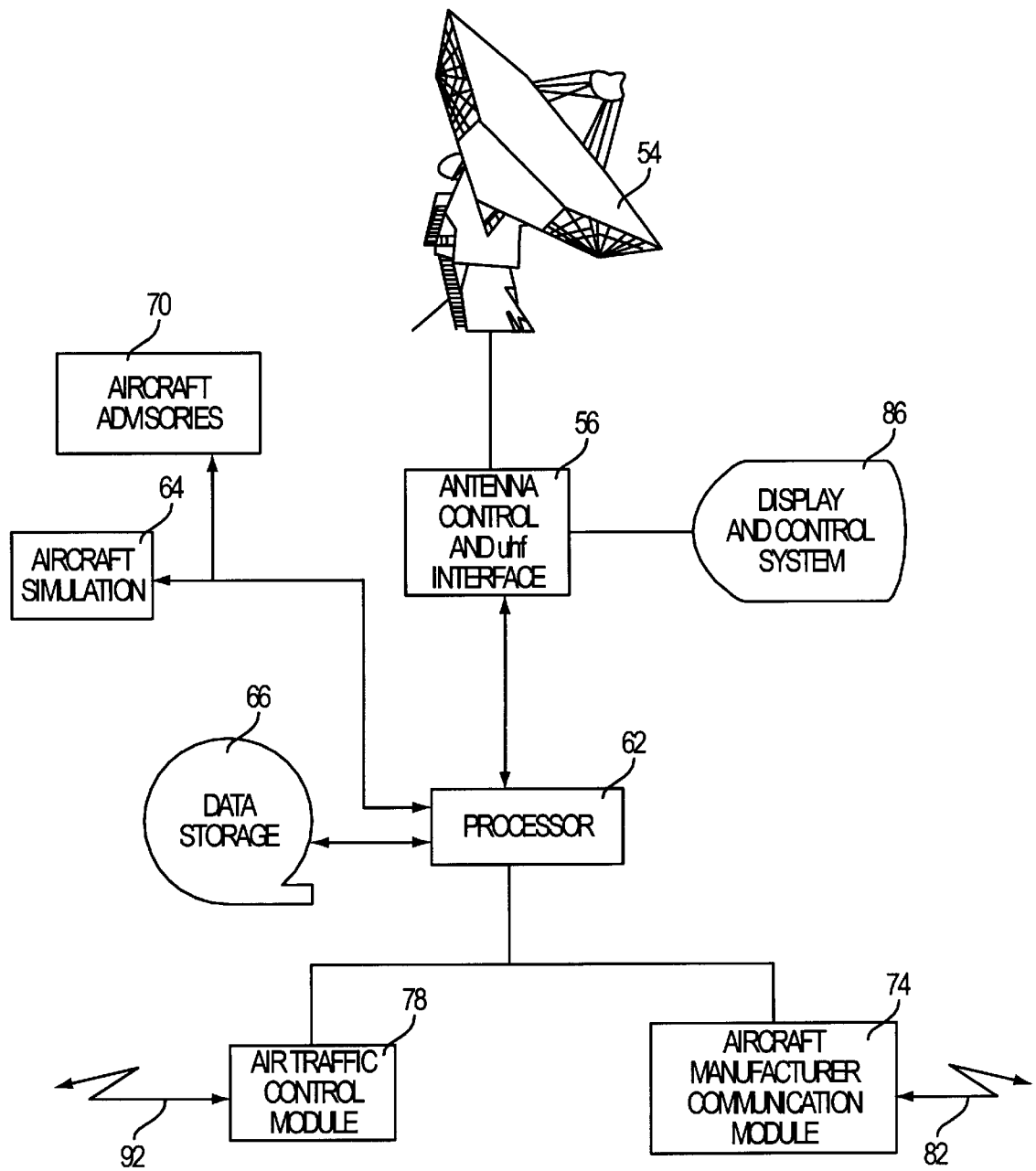
FIG. 3 is a block schematic of the CGBS according to the invention.

FIG. 3 is a block diagram of the CGBS 42. It shows the CGBS receiving and transmitting antenna 54, and the antenna control and uhf interface 56 that converts the received satellite signal into an electrical signal. The received signal represents aircraft performance and control 18, audio 22, video 26, and high accuracy position and altitude data 44. These signals are then sent to: the CGBS processing station 62 for data analysis, and performance and problem simulation; the expert system module 64 for crash avoidance simulations; the archive 66 for data storage; the advisory module 70 for generating aircraft advisories; the aircraft manufacturer's module 74 for distribution to the aircraft manufacturer's ground based facilities for expert crash avoidance and maintenance advisories; and the ATC module 78 for distribution to airport and area ATC facilities. Since the CGBS 42 is on the ground its temperature, environment, humidity and air can be readily controlled so that the archive storage of the aircraft's sensor data 18, 22, 26, 44 is very reliable. In addition, the real-time analysis of the data will alert the operational aircraft 10 of problems. In some cases, this may occur prior to the pilot's recognition of a problem. Thus in addition to reducing the equipment aboard the aircraft it can lighten the pilot's work load.

Ground communication can be made over wide band-width, fiber optic cables, satellites or other rf communication links. In the continental United States the wide band-width, fiber optic communication link is preferred. The CGBS 42 acts as communication concentrator and it is through this facility 42 that world wide communication with the aircraft 10 occurs. At this facility 42 weather data is collected from the government weather bureau facilities. The weather data, map data, DTED and ATC data is also combined with other aircraft operational data 18, 22, 26, 44 to provide: emergency or safety of flight advisories, flight efficiency or fuel economy advisories, and flight separation advisories.

FIGS. 2 and 3 show how the closest, unobstructed line-of sight satellite 38 receives the data 18, 22, 26, 44 from aircraft 10 equipped with SMART modules 14. Data travels over the system to the satellite 38 closest to the CGBS 42. This satellite 38 is in line of sight communication with the CGBS 42, which transmits and receives data to and from the CGBS antenna 54. The antenna 54 is controlled by antenna control and uhf interface module 56. The uhf signals 18, 22, 26, 44 are also demodulated and sorted, by aircraft, in this module 56. The data 18, 22, 26, 44 is then sent to the ground processor 62 for analysis.

One function of the ground processor 62 is to send the data 18, 22, 26, 44 to the archival data storage system 66 where it is safely stored in an air conditioned environment, for future retrieval, on magnetic disc or tape, or optical memory. Another function of the processor 62 is to coordinate its data with the aircraft simulation processor 64. This processor 64 performs an expert system analysis based on past performance, i.e. archived, data, aircraft specific stress accumulation statistics and world wide weather and wind shear, DTED and ATC information. Based on this simulation, aircraft real-time advisories are generated by the advisory module 70. Emergency advisories are also based on the aircraft manufacturer's simulations conducted at their facilities and communicated to the CGBS 42 via the wide band-width, fiber optic link 82. The data can be viewed and controlled by the CGBS operators on the display and control system 86. The position, altitude and aircraft velocity data is also sent to the ATC module 78 for real-time transmission to the airport and area flight controllers over the wide band-width, fiber optic communication link 92.

Weather data from weather services are also communicated over this link 92. This data when mixed with the aircraft sensor data 18, 22, 26, 44 at the aircraft simulation module 64 provide world wide safety of flight trajectories, safe to take off and land, and fuel efficiency economy of flight advisories. These advisories are sent to the aircraft 10 over the world wide communication link illustrated in FIG. 2. In addition, world wide advisories are sent to the aircraft 10 by the ATC based on their information for aircraft separation. In a similar manner, the aircraft data 18, 22, 26, 44 is sent to aircraft manufacturer personnel by the communication module 74 over the wide band-width, fiber optic link 82.

Advisories can be sent by the manufacturers providing the best way to handle problems based on their expert knowledge of the aircraft 10. These aid in safely flying the aircraft or efficiently servicing an aircraft that is experiencing equipment malfunctions on the ground. The in-air safety of flight advisories go to the advisory center 70 to be integrated with CGBS and air traffic controller generated information so as to provide a single emergency advisory, based on all of the data. This advisory is sent to the aircraft 10 via the global communication network. For aircraft experiencing problems on the ground, an aircraft manufacturer remotely samples the aircraft's performance and then sends advisories over the network to the aircraft's ground maintenance personnel. These advisories represent the latest diagnostic procedures and problem specific maintenance information. These maintenance advisories are sent to an aircraft maintenance terminal display that interfaces with the SMART communication system 14 on board the aircraft. Thus the maintenance advisory provides efficient, safe and effective repair of the aircraft using the most up-to-date procedures.

Figure 4:
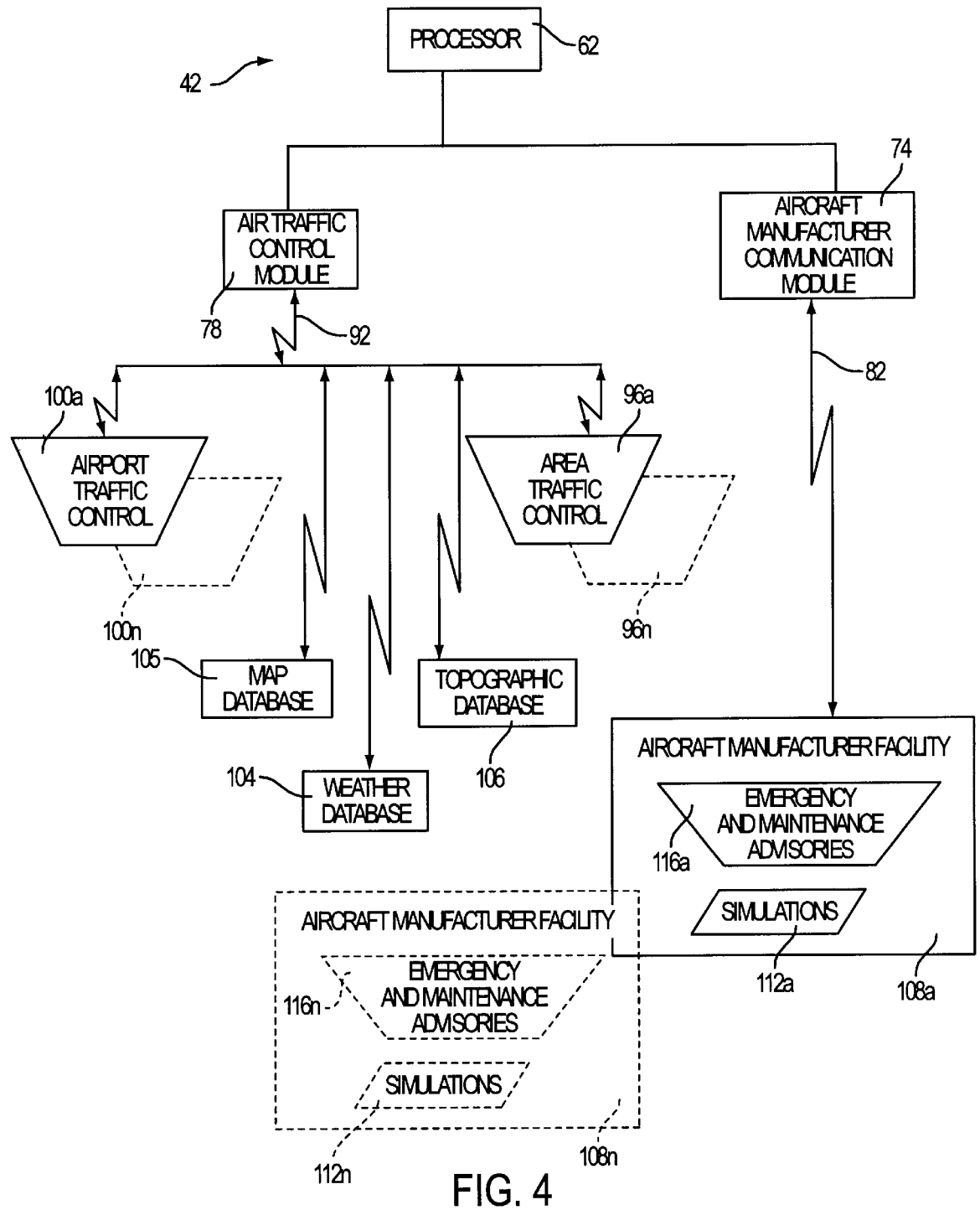
FIG. 4 is a block schematic of the Ground Based Distribution System according to the invention.
Figure 1:
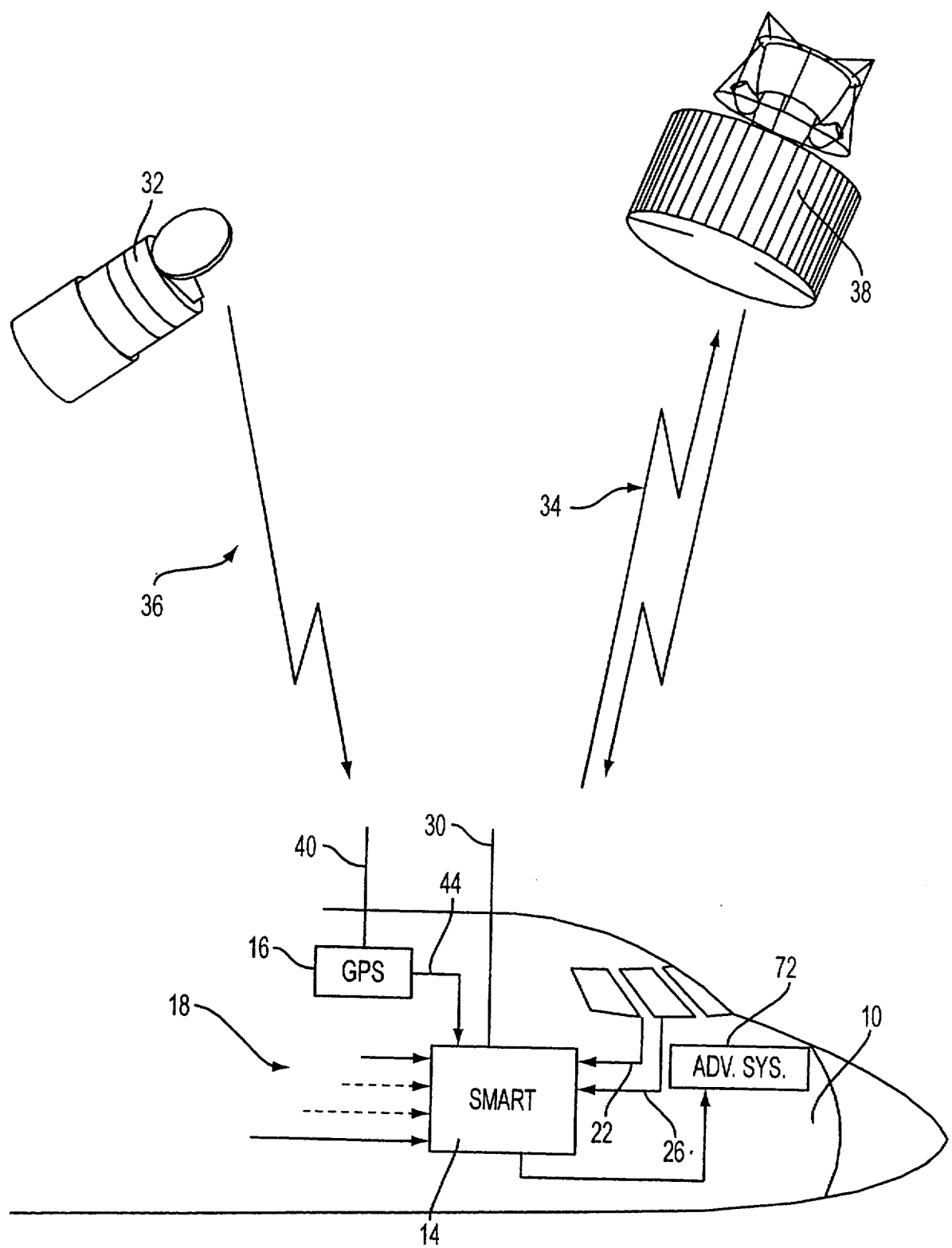
Figure 2:
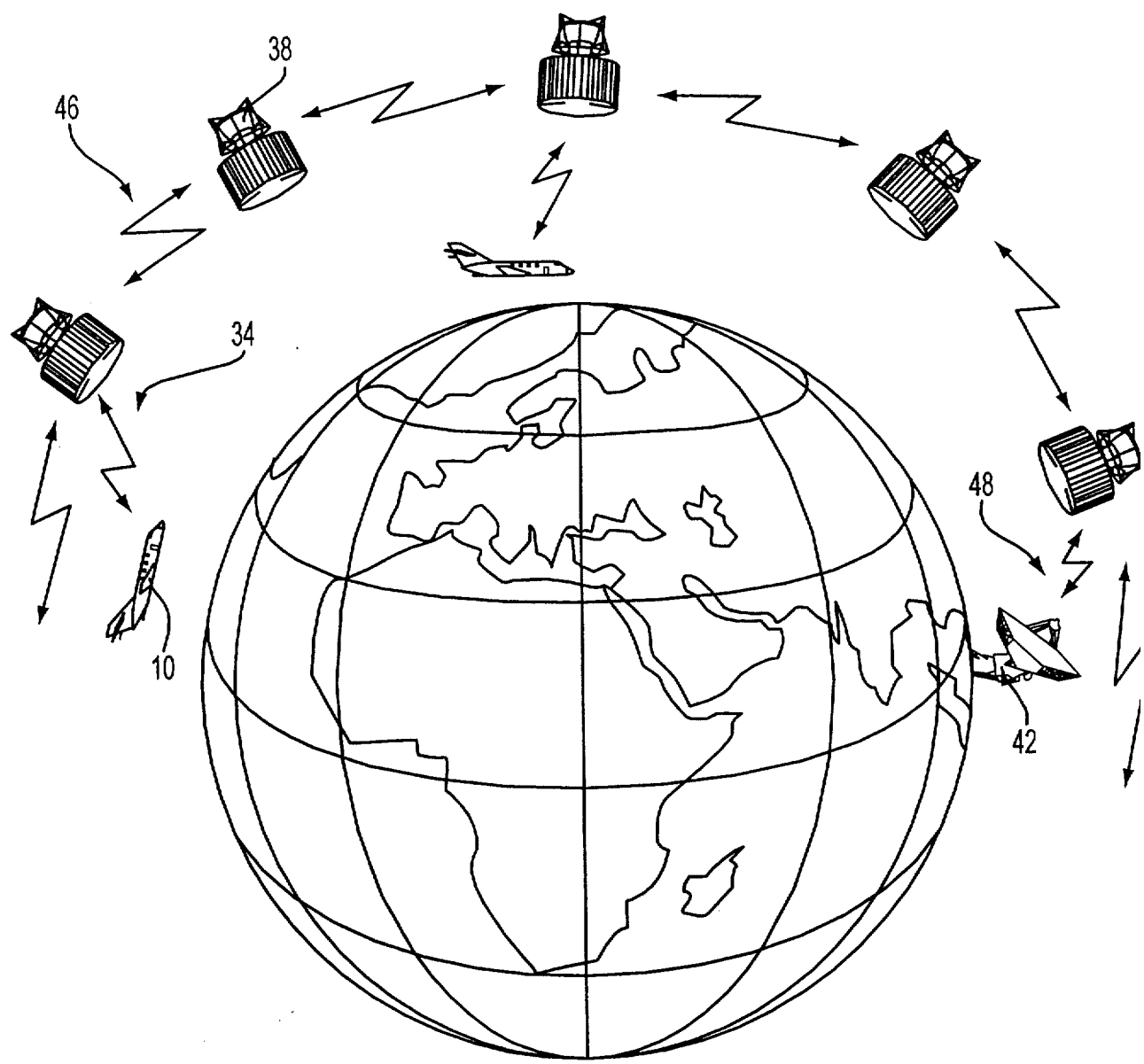

FIG. 4 provides greater detail about CGBS 42 communication with the ground based flight control and manufacturing facilities. The CGBS ground processor 62 communicates with the ATC communication module 78. Digital data is communicated serially over a wide band-width, fiber optic link 92 to the air traffic control facilities 100 and the area traffic control facilities 96. There are a large number of civil and military airport and area ATCs in present use. These are indicated 100a to 100n for the airport air traffic controllers and 96a to 96n for the area air traffic controllers. Each of the air traffic controllers 96, 100 can tap the wide band-width, fiber optic communication link 92 for the specific aircraft data of interest to them. The air traffic controllers can also send, to specific or to all SMART 14 equipped aircraft 10 in the world, advisory data over the same communication link.

The CGBS 42 communicates these advisories, via the satellite 38 communication link 48, 46, 34, to the aircraft 10. In a similar fashion the CGBS 42 receives world wide weather data from the weather bureau 104 and world wide map and topographic data from the map 105 and topographic 106 databases. The CGBS 42 then, by its knowledge of the aircraft location, flight plans and operational characteristics, tailors this global weather data to weather data that is specific to each aircraft's area of operation for safety and economy of flight advisories.

Aircraft manufacturing facilities 108 communicate with the CGBS 42 ground processor 62 via the aircraft manufacturer communication module's 74, wide band-width, fiber optic communication link 82. Since there are a number of different aircraft manufacturers they are indicated by reference numbers 108a to 108n. Their concomitant emergency and maintenance advisory facilities are indicated by the reference numbers 116a to 116n. Each manufacturer maintains an historical log of the aircraft 10 in service for configuration, stress, maintenance service and end of life assembly data. The manufacturers also maintain aircraft simulation capability 112 to aid in providing safety of flight advisories to aircraft 10 that are experiencing a problem. The different simulation facilities are shown by the reference numbers 112a to 112n. These advisories occur whether the problem was first surfaced by the in-air aircraft personnel, or by the on the ground monitoring personnel or by simulations at the CGBS 42 or aircraft manufacturer's facility 108.

The CGBS 42 and the aircraft manufacturer's facility 108 check the aircraft operational capability by remotely sampling the aircraft's operational status parameters 18, 22, 26, 44 and using other factors such as weather, ATC information, map, and DTED. The simulations utilize real-time analysis of the vehicle data and past performance to provide expert system advisories. For an aircraft that is experiencing a problem on the ground, the aircraft manufacturer's facilities 108 still sample the operational status of the aircraft's flight critical assemblies via the real-time, world wide, communication link 34, 46, 48. The manufacturer's facility 108 transmits expert system repair advisories to the aircraft's 10 maintenance personnel. These include the latest approved, problem specific, service manual data to efficiently and safely correct the aircraft's problem.

Operation of this invention, Remote Aircraft Flight Recorder and Advisory System, 50 can be summarized as follows. The aircraft 10 is fitted with a SMART module 14, that accepts sensor signals 18 depicting the performance of many of the flight safety critical assemblies. It converts any of the analog sensor data 18 into a digital format. These signals are the same as those that are presently sent to the existing flight crash recorders aboard aircraft which records vital flight information such as air speed, height, attitude, landing gear status, fuel status as well as the position of the aircraft controls and latitude and longitude, which is gleaned from radio navigation aids and the inertial navigation system (INS), when available. Unlike the existing crash recorder that must be recovered from a crash site to obtain an understanding of the cause of the crash, the system depicted in FIGS. 1–4 has a telemetry system to radio these signals to a world wide communication system and to a final destination known as the CGBS 42.

In addition to the standard flight sensors presently used in existing flight recorders, position and altitude 44 signals from the GPS or GLONASS receivers, acoustical sensors 22 that record cockpit sounds, and video camera data 26 that records the passengers entering the vehicle, the states of the cargo, hull and the cockpit during flight, aircraft identification and latest configuration are also sent to SMART 14 for telemetry to the CGBS 42. The SMART module 14 accepts these signals 18, 22, 26, 44 and then transmits them over the uhf radio link 34, 46, 48. The preferred embodiment of this invention 50 utilizes a global satellite 38 communication system. The SMART module's 14 uhf output is sent to a satellite antenna 30 where the signal is radioed to a satellite 38 that is in a direct line of sight with the aircraft 10. The combined signal is then relayed, either by LEO or a synchronous orbit world wide communication satellite chain, until it is transmitted to the CGBS 42 by the communication satellite 38 that is in a direct line of sight with the CGBS antenna 54.

At the CGBS 42, these signals are archived. Also, aircraft data 18 and signals 22, 26, 44 are distributed, utilizing fiber optic ground or satellite links, to flight controller facilities 100, 96 and to the aircraft manufacturers 108. It distributes the aircraft sensor data 18, 22, 26, 44 to them in real-time so as to solicit their expert analysis and help in generating the advisories. Real-time analysis of the pre-flight aircraft data along with other data such as weather 104, airport and its local area map 105, three dimensional topographical map information 106, from data bases such as Digital Terrain Elevation Data (DTED), ATC data, wind shear, and aircraft configuration are also used in generating advisories.

The SMART 14 also accepts advisory signals sent from the CGBS 42 to the aircraft 10. There are maintenance advisories and three types of in-flight advisories: emergency or safety of flight, flight efficiency or fuel economy, and flight separation. The SMART module 14 receives these signals and sends maintenance advisories to an on-board maintenance communication subsystem. In-flight advisories are sent to the pilot's audio system and to the pilot's warning panel. Thus SMART 14 concentrates the audio, video, digital discrete and sensor signals to minimize the weight, power expended, cost of equipment and uhf radio antennas carried aboard the aircraft.

Large, commercial, passenger aircraft will be fitted with systems 50 capable of monitoring an extensive number of their performance and control signals 18. Small, private aircraft do not need such extensive monitoring and will have systems 50 capable of monitoring only a limited number of performance and control signals 18.

The remote aircraft flight recorder and advisory system 50 has been described with reference to a particular embodiment. Other modifications and enhancements can be made without departing from the spirit and scope of the claims that follow.

What is claimed is:

1. A remote flight recorder and aircraft advisory system comprising:

an aircraft performance means for detecting aircraft performance and control parameters;

a cockpit audio detector means for detecting cockpit sounds and turning them into an audio signal;

a video camera means for capturing activities in the cockpit, passenger compartment and cargo compartment, and turning them into a video signal;

a position and altitude detector means for accurately determining aircraft position and altitude data, and turning these data into a position signal and an altitude signal;

a pilot's audio and visual advisory means, located in the cockpit of an aircraft, for providing audio and visual advice to the pilot;

a maintenance communications means, located on board said aircraft, for providing maintenance advice to maintenance personnel;

a sensor multiplexer receiver and transmitter means, located on board said aircraft, for:
  accepting said aircraft performance and control parameters, said audio signal, said video signal, said position signal and said altitude signal; converting said aircraft performance and control parameters, when necessary, to digital form; adding an aircraft identification and configuration label; converting said aircraft performance and control parameters, said audio signal, said video signal, said position signal, said altitude signal and said identification and configuration label to an outgoing rf signal and broadcasting said outgoing rf signal; and
  receiving an incoming rf signal, converting it to a ground advisory, an in-flight advisory and a maintenance advisory, feeding said ground advisory and said in-flight advisory to said pilot's audio and visual advisory means and feeding said maintenance advisory to said maintenance communication means;
an airport traffic control database means for providing information about airport ground and air traffic;
an area traffic control database means for providing information about area traffic;
a weather database means for providing global weather information;
a map database means for providing a map;
a global topographic database means for providing topographic elevation data;
an aircraft manufacturer's database means for providing aircraft data, maintenance information, and performance, problem and crash avoidance simulations;
a central station means, located on the ground, for receiving said outgoing rf signal and converting it to said aircraft performance and control parameters, said audio signal, said video signal, said position signal, said altitude signal and said aircraft identification and configuration label, and broadcasting said incoming rf signal;
a processing means, connected to said central station means, for:
  archiving said aircraft performance and control parameters, said audio signal, said video signal, said position signal and said altitude signal thus creating an archived data database;
  combining said aircraft performance and control parameters, said audio signal, said video signal, said position signal and said altitude signal with the archived data, said airport ground and air traffic information, said area traffic information, said global weather information, said map, said topographic elevation data, said aircraft data and said performance, problem and crash avoidance simulations;
  performing additional performance, problem and crash avoidance simulations;
  generating said on ground, in-flight and maintenance advisories; and
  converting said on ground, in-flight and maintenance advisories to said incoming rf signal;
a display and control means, connected to said processing means, for displaying operation of said processing means and for allowing operator control of said processing means;
a global rf communications network means for conveying said outgoing signal from said aircraft to said central station means and conveying said incoming rf signal from said central station means to said aircraft; and
a communications means for allowing communication between said processing means and said airport traffic control database means, said area traffic control database means, said weather database means, said map database means, and said topographic database means.

2. A remote flight recorder and aircraft advisory system as claimed in claim 1 in which said position and altitude detector means has its own antenna.

3. A remote flight recorder and aircraft advisory system as claimed in claim 1 in which said position and altitude detector means shares an antenna with said sensor multiplexer receiver and transmitter means.

4. A remote flight recorder and aircraft advisory system comprising:
an aircraft sensor which detects aircraft performance and control parameters;
a cockpit audio sensor which detects cockpit sounds and turns them into an audio signal;
a video camera system which captures activities in the cockpit, passenger compartment and cargo compartment and turns them into a video signal;
a position and altitude detector which determines aircraft position and altitude data and turns these data into a position signal and an altitude signal;
means, located in the cockpit of an aircraft, for providing audio and visual advice to the pilot;
means, located on board said aircraft, for providing maintenance advice to maintenance personnel;
a sensor multiplexer receiver and transmitter, located on board said aircraft, which:
  accepts said aircraft performance and control parameters, said audio signal, said video signal, said position signal and said altitude signal; converts said aircraft performance and control parameters, when necessary, to digital form; adds an aircraft identification and configuration label; converts said aircraft performance and control parameters, said audio signal, said video signal, said position signal, said altitude signal and said aircraft identification and configuration label to an outgoing rf signal and broadcasts said outgoing rf signal; and
  receives an incoming rf signal, converts it to an on ground advisory, an in-flight advisory and a maintenance advisory, feeds said on ground advisory and said in-flight advisory to said pilot's audio and visual advisory means and feeds said maintenance advisory to said maintenance communication means;
an airport ground and air traffic control database for providing airport ground and air traffic information;
an area traffic control database for providing area traffic information;
a weather database for providing global weather information;
a map database for providing a map;
a topographic elevation database for providing topographic elevation data;
an aircraft manufacturer's database for providing aircraft data;
a central station, located on the ground, which receives said outgoing rf signal and converts it to said aircraft performance and control parameters, said audio signal, said video signal, said position signal, said altitude signal and said aircraft identification and configuration label, and broadcasts said incoming rf signal;

a processing means, connected to said central station means, for:
  archiving said aircraft performance and control parameters, said audio signal, said video signal, said position signal and said altitude signal thus creating an archived data database;
  combining said aircraft performance and control parameters, said audio signal, said video signal, said position signal and said altitude signal with the archived data, said airport ground and air traffic information, said area traffic information, said global weather information, said map, said topographic elevation data, said aircraft data and said aircraft data;
  performing performance, problem and crash avoidance simulations;
  generating said on ground, in-flight and maintenance advisories; and
  converting said on ground, in-flight and maintenance advisories to said incoming rf signal;
a display and control subsystem, connected to said processing means,
a global rf communications network which conveys said outgoing signal from said aircraft to said central station and conveys said incoming rf signal from said central station to said aircraft; and
a communications link which allows communication between said processing means and said airport traffic control database, said area traffic control database, said weather database, said map database, and said topographic elevation database.

5. A remote flight recorder and aircraft advisory system as claimed in claim 4 in which said position and altitude detector has its own antenna.

6. A remote flight recorder and aircraft advisory system as claimed in claim 4 in which said position and altitude detector shares an antenna with said sensor multiplexer receiver and transmitter.

7. A method of remotely recording flight data and providing aircraft advisories comprising the steps:
  mounting a performance sensor in an aircraft;
  mounting a control sensor in said aircraft;
  mounting an audio sensor in the cockpit of said aircraft;
  mounting a video camera in the cockpit of said aircraft;
  mounting a video camera in the passenger compartment of said aircraft;
  mounting a video camera in the cargo compartment of said aircraft;
  installing an aircraft position and altitude detector within said aircraft;
  mounting a means in said cockpit for providing audio and visual advice to the pilot;
  mounting a means in said aircraft for providing maintenance advice to maintenance personnel;
  mounting a sensor multiplexer receiver and transmitter system, in said aircraft;
  providing communications access to an airport ground and air traffic control database;
  providing communications access to an area air traffic control database;
  providing communications access to a weather database;
  providing communications access to a map database;
  providing communications access to a topographic elevation database;
  providing communications access to an aircraft manufacturer's database;
  providing a central ground based station;
  providing a processing means within said central ground based station;
  providing a display and control subsystem, connected to said processing means;
  providing a global, rf communications network;
  accepting signals from said aircraft performance and control sensors, said audio sensor, said video cameras, and said position and altitude detector into said sensor multiplexer receiver and transmitter;
  converting, in said sensor multiplexer receiver and transmitter, said signal from said aircraft performance and control sensors, when necessary, to digital form;
  adding an aircraft identification and configuration label;
  converting said signals, and said aircraft identification and configuration label, in said sensor multiplexer receiver and transmitter, to an outgoing rf signal;
  transmitting said outgoing rf signal from said sensor multiplexer receiver and transmitter to said central ground base station via said global rf communications network;
  receiving said outgoing rf signal at said central ground based station;
  converting said outgoing rf signal at said ground based central station to said signals plus said aircraft identification and configuration label;
  performing within said processing means the steps of:
    archiving said signals thus creating an archived data database;
    combining said signals with the archived data, and information from said airport traffic database, said area traffic database, said weather database, said map database, said topographic database and said aircraft manufacturer's database;
    performing real-time performance, problem and crash avoidance simulations;
    generating ground, in-flight and maintenance advisories; and
    converting said ground, in-flight and maintenance advisories to an incoming rf signal;
  sending said incoming rf signal, via said global communications network, from said central ground based station to said sensor multiplexer receiver and transmitter;
  converting said incoming rf signal, at said sensor multiplexer receiver and transmitter, to said ground, in-flight and maintenance advisories;
  feeding said in-flight advisory from said sensor multiplexer receiver and transmitter to said pilot's audio and visual advisory means; and
  feeding said maintenance advisory from said sensor multiplexer receiver and transmitter to said maintenance communication means.

8. A remote flight recorder and aircraft advisory system comprising:
  an aircraft performance means for detecting aircraft performance and control parameters;
  a position and altitude detector means for accurately determining aircraft position and altitude data, and turning these data into a position signal and an altitude signal;
  a pilot's audio and visual advisory means, located in the cockpit of an aircraft, for providing audio and visual advice to the pilot;

a sensor multiplexer receiver and transmitter means, located on board said aircraft, for:
  accepting said aircraft performance and control parameters, said position signal and said altitude signal; converting said aircraft performance and control parameters, when necessary, to digital form; adding an aircraft identification and configuration label; converting said aircraft performance and control parameters, said position signal, said altitude signal and said identification and configuration label to an outgoing rf signal and broadcasting said outgoing rf signal; and
  receiving an incoming rf signal, converting it to a ground advisory, an in-flight advisory and a maintenance advisory, feeding said ground advisory and said in-flight flight advisory to said pilot's audio and visual advisory means and feeding said maintenance advisory to said maintenance communication means;
an airport traffic control database means for providing information about airport ground and air traffic;
an area traffic control database means for providing information about area traffic;
a global weather database means for providing weather information;
a map database means for providing a map;
a global topographic database means for providing topographic elevation data;
a central station means, located on the ground, for receiving said outgoing rf signal and converting it to said aircraft performance and control parameters, said position signal, said altitude signal and said aircraft identification and configuration label, and broadcasting said incoming rf signal;
a processing means, connected to said central station means, for:
  archiving said aircraft performance and control parameters, said position signal and said altitude signal thus creating an archived data database;
  combining said aircraft performance and control parameters, said position signal and said altitude signal with the archived data, said airport ground and air traffic information, said area traffic information, said global weather information, said map and said topographic elevation data;
a display and control means, connected to said processing means, for displaying operation of said processing means and for allowing operator control of said processing means; and
a global rf communications network means for conveying said outgoing signal from said aircraft to said central station means and conveying said incoming rf signal from said central station means to said aircraft.

9. A remote flight recorder and aircraft advisory system as claimed in claim 8 in which said position and altitude detector means has its own antenna.

10. A remote flight recorder and aircraft advisory system as claimed in claim 8 in which said position and altitude detector means shares an antenna with said sensor multiplexer receiver and transmitter means.

11. A remote flight recorder and aircraft advisory system comprising:
  an aircraft sensor which detects aircraft performance and control parameters;
  a position and altitude detector which determines aircraft position and altitude data and turns these data into a position signal and an altitude signal;

means, located in the cockpit of an aircraft, for providing audio and visual advice to the pilot;
a sensor multiplexer receiver and transmitter, located on board said aircraft, which:
  accepts said aircraft performance and control parameters, said position signal and said altitude signal; converts said aircraft performance and control parameters, when necessary, to digital form; adds an aircraft identification and configuration label; converts said aircraft performance and control parameters, said position signal, said altitude signal and said aircraft identification and configuration label to an outgoing rf signal and broadcasts said outgoing rf signal; and
  receives an incoming rf signal, converts it to an on ground advisory, an in-flight advisory and a maintenance advisory, feeds said on ground advisory and said in-flight advisory to said pilot's audio and visual advisory means and feeds said maintenance advisory to said maintenance communication means;
an airport ground and air traffic control database for providing airport ground and air traffic information;
an area traffic control database for providing area traffic information;
a weather database for providing global weather information;
a map database for providing a map;
a topographic elevation database for providing topographic elevation data;
a central station means, located on the ground, which receives said outgoing rf signal and converts it to said aircraft performance and control parameters, said position signal, said altitude signal and said aircraft identification and configuration label, and broadcasts said incoming rf signal;
a processing means, connected to said central station means, for:
  archiving said aircraft performance and control parameters, said position signal and said altitude signal thus creating an archived data database;
  combining said aircraft performance and control parameters, said position signal and said altitude signal with the archived data, said airport ground and air traffic information, said area traffic information, said global weather information, said map and said topographic elevation data;
a display and control subsystem connected to said processing means; and
a global rf communications network which conveys said outgoing signal from said aircraft to said central station and conveys said incoming rf signal from said central station to said aircraft.

12. A remote flight recorder and aircraft advisory system as claimed in claim 11 in which said position and altitude detector has its own antenna.

13. A remote flight recorder and aircraft advisory system as claimed in claim 11 in which said position and altitude detector shares an antenna with said sensor multiplexer receiver and transmitter.

14. A method of remotely recording flight data and providing aircraft advisories comprising the steps:
  mounting a performance sensor in an aircraft;
  mounting a control sensor in said aircraft;
  installing an aircraft position and altitude detector within said aircraft;

mounting a means in said cockpit for providing audio and visual advice to the pilot;

mounting a sensor multiplexer receiver and transmitter system, in said aircraft;

providing communications access to an airport ground and air traffic control database;

providing communications access to an area air traffic control database;

providing communications access to a weather database;

providing communications access to a map database;

providing communications access to a topographic elevation database;

providing a central ground based station;

providing a processing means within said central ground based station;

providing a display and control subsystem, connected to said processing means;

providing a global, rf communications network;

accepting signals from said aircraft performance and control sensors and said position and altitude detector into said sensor multiplexer receiver and transmitter;

converting, in said sensor multiplexer receiver and transmitter, said signal from said aircraft performance and control sensors, when necessary, to digital form;

adding an aircraft identification and configuration label;

converting said signals and aircraft identification and configuration label, in said sensor multiplexer receiver and transmitter, to an outgoing rf signal;

transmitting said outgoing rf signal from said sensor multiplexer receiver and transmitter to said central ground base station via said global rf communications network;

receiving said outgoing rf signal at said central ground based station;

converting said outgoing rf signal at said ground based central station to said signals plus said aircraft identification and configuration label;

performing within said processing means the steps of:
  archiving said signals thus creating an archived data database;
  combining said signals with the archived data, and information from said airport traffic database, said area traffic database, said weather database, said map database and said topographic database;
  performing real-time performance, problem and crash avoidance simulations;
  generating ground, and in-flight advisories; and
  converting said ground and in-flight advisories to an incoming rf signal;

sending said incoming rf signal, via said global communications network, from said central ground based station to said sensor multiplexer receiver and transmitter;

converting said incoming rf signal, at said sensor multiplexer receiver and transmitter, to said ground and in-flight advisories; and feeding said in-flight advisory from said sensor multiplexer receiver and transmitter to said pilot's audio and visual advisory means.

15. A remote flight recorder and aircraft advisory system comprising:

a position and altitude detector means for accurately determining aircraft position and altitude data, and turning these data into a position signal and an altitude signal;

a pilot's audio and visual advisory means, located in the cockpit of an aircraft for providing audio and visual advice to the pilot;

a sensor multiplexer receiver and transmitter means, located on board said aircraft, for:
  accepting said aircraft position signal and said altitude signal; adding an aircraft identification and configuration label; converting said aircraft position signal, said altitude signal and said identification and configuration label to an outgoing rf signal and broadcasting said outgoing rf signal; and
  receiving an incoming rf signal, converting it to an in-flight advisory feeding said in-flight advisory to said pilot's audio and visual advisory means;

an airport traffic control database means for providing information about airport ground and air traffic;

an area traffic control database means for providing information about area traffic;

a global weather database means for providing weather information;

a map database means for providing a map;

a central station means, located on the ground, for receiving said outgoing rf signal and converting it to said position signal, said altitude signal and said aircraft identification and configuration label, and broadcasting said incoming rf signal;

a processing means, connected to said central station means, for:
  combining said aircraft position signal and said altitude signal with said airport ground and air traffic information, said area traffic information, said global weather information and said map;
  generating said in-flight advisory; and
  converting said in-flight advisory to said incoming rf signal;

a display and control means, connected to said processing means, for displaying operation of said processing means and for allowing operator control of said processing means;

a global rf communications network means for conveying said outgoing signal from said aircraft to said central station means and conveying said incoming rf signal from said central station means to said aircraft; and a communications means for allowing communication between said processing means and said airport traffic control database, said area traffic control database, said weather database and said map database.

16. A remote flight recorder and aircraft advisory system as claimed in claim 15 in which said position and altitude detector means has its own antenna.

17. A remote flight recorder and aircraft advisory system as claimed in claim 15 in which said position and altitude detector means shares an antenna with said sensor multiplexer receiver and transmitter means.

18. A remote flight recorder and aircraft advisory system as claimed in claim 15 in which said in flight advisory relates to weather conditions including clear air turbulence and lightening.

19. A remote flight recorder and aircraft advisory system as claimed in claim 15 in which said in flight advisory relates to optimum and efficient aircraft routing.

20. A remote flight recorder and aircraft advisory system as claimed in claim 15 in which said in flight advisory relates to optimal aircraft separation to avoid clear air turbulence.

21. A remote flight recorder and aircraft advisory system comprising:

a position and altitude detector which determines aircraft position and altitude data and turns these data into a position signal and an altitude signal;

means, located in the cockpit of an aircraft, for providing audio and visual advice to the pilot;

a sensor multiplexer receiver and transmitter, located on board said aircraft, which:

accepts said aircraft position signal and said altitude signal; adds an aircraft identification and configuration label; converts said aircraft position signal, said altitude signal and said aircraft identification and configuration label to an outgoing rf signal and broadcasts said outgoing rf signal; and receives an incoming rf signal, converts it to an in-flight advisory and feeds said in-flight advisory to said pilot's audio and visual advisory means;

an airport ground and air traffic control database for providing aircraft ground and air traffic information;

an area traffic control database for providing area traffic information;

a weather database for providing global weather information;

a map database for providing a map;

a topographic elevation database for providing topographic elevation data;

a central station, located on the ground, which receives said outgoing rf signal and converts it to said aircraft position signal, said altitude signal and said aircraft identification and configuration label, and broadcasts said incoming rf signal;

a processing means, connected to said central station means, for:

combining said aircraft airport ground and air traffic information, said area traffic information, said global weather information, said map and said topographic elevation data;

generating said in-flight advisory; and converting said in-flight advisory to said incoming rf signal;

a display and control subsystem, connected to said processing means, a global rf communications network which conveys said outgoing signal from said aircraft to said central station and conveys said incoming rf signal from said central station to said aircraft; and a communications link which allows communication between said processing means and said airport traffic control database, said area traffic control database, said weather database, said map database, and said topographic elevation database.

22. A remote flight recorder and aircraft advisory system as claimed in claim 21 in which said position and altitude detector has its own antenna.

23. A remote flight recorder and aircraft advisory system as claimed in claim 21 in which said position and altitude detector shares an antenna with said sensor multiplexer receiver and transmitter.

24. A remote flight recorder and aircraft advisory system as claimed in claim 21 in which said in flight advisory relates to weather conditions including clear air turbulence and lightening.

25. A remote flight recorder and aircraft advisory system as claimed in claim 21 in which said in flight advisory relates to optimum and efficient aircraft routing.

26. A remote flight recorder and aircraft advisory system as claimed in claim 21 in which said in flight advisory relates to optimal aircraft separation to avoid clear air turbulence.

27. A method of remotely recording flight data and providing aircraft advisories comprising the steps of:

installing an aircraft position and altitude detector within an aircraft;

mounting a means in said cockpit for providing audio and visual advice to the pilot;

mounting a sensor multiplexer receiver and transmitter system, in said aircraft;

providing communications access to an airport ground and air traffic control database;

providing communications access to an area air traffic control database;

providing communications access to a weather database;

providing communications access to a map database;

providing communications access to a topographic elevation database;

providing a central ground based station;

providing a processing means within said central ground based station;

providing a display and control subsystem, connected to said processing means;

providing a global, rf communications network;

accepting signals from said aircraft position and altitude detector into said sensor multiplexer receiver and transmitter;

adding an aircraft identification and configuration label;

converting said signals, and aircraft identification and configuration label, in said sensor multiplexer receiver and transmitter, to an outgoing rf signal;

transmitting said outgoing rf signal from said sensor multiplexer receiver and transmitter to said central ground base station via said global rf communications network;

receiving said outgoing rf signal at said central ground based station;

converting said outgoing rf signal at said ground based central station to said signals plus said aircraft identification and configuration label;

performing within said processing means the steps of:
combining said signals with information from said airport traffic database, said area traffic database, said weather database, said map database and said topographic elevation database;
generating in-flight advisories; and
converting said in-flight advisories to an incoming rf signal;

sending said incoming rf signal, via said global communications network, from said central ground based station to said sensor multiplexer receiver and transmitter;

converting said incoming rf signal, at said sensor multiplexer receiver and transmitter, to said in-flight advisories; and feeding said in-flight advisories from said sensor multiplexer receiver and transmitter to said pilot's audio and visual advisory means.

* * * * *

UNITED STATES PATENT AND TRADEMARK OFFICE
CERTIFICATE OF CORRECTION

Page 1 of 3

PATENT NO. : 5,890,079
INVENTOR(S) : Seymour Levine
DATED : March 30, 1999

It is certified that error appears in the above-identified patent and that said Letters Patent is hereby corrected as shown below:

Drawings:

Delete Drawing sheets 1-2, and substitute therefor the drawing sheets, consisting of Figs. 1-2, as shown on the attached pages.

Signed and Sealed this

Fourteenth Day of September, 1999

Attest:

Q. TODD DICKINSON

*Attesting Officer*     *Acting Commissioner of Patents and Trademarks*